(12) United States Patent
Sessions

(10) Patent No.: US 12,467,484 B2
(45) Date of Patent: Nov. 11, 2025

(54) PNEUMATIC OPERATION AND SELF-ALIGNMENT OF LINEAR ACTUATOR

(71) Applicant: Liftwave, Inc., Somerville, MA (US)

(72) Inventor: Blake Sessions, Boston, MA (US)

(73) Assignee: Liftwave, Inc., Somerville, MA (US)

( * ) Notice: Subject to any disclaimer, the term of this patent is extended or adjusted under 35 U.S.C. 154(b) by 0 days.

(21) Appl. No.: 18/648,643

(22) Filed: Apr. 29, 2024

(65) Prior Publication Data

US 2025/0003431 A1 Jan. 2, 2025

Related U.S. Application Data

(63) Continuation of application No. 18/217,360, filed on Jun. 30, 2023, now Pat. No. 12,000,415.

(51) Int. Cl.
F15B 15/14 (2006.01)
F15B 15/26 (2006.01)

(52) U.S. Cl.
CPC ........ *F15B 15/1471* (2013.01); *F15B 15/262* (2013.01); *F15B 2211/50572* (2013.01)

(58) Field of Classification Search
CPC .. F15B 15/061; F15B 15/084; F15B 15/1414; F15B 15/1471; F16H 19/06–08
See application file for complete search history.

(56) References Cited

U.S. PATENT DOCUMENTS

| | | |
|---|---|---|
| 4,411,166 A | 10/1983 | Marcovici |
| 4,947,698 A | 8/1990 | Dodds et al. |
| 5,761,985 A | 6/1998 | Stoll |
| 6,015,097 A | 1/2000 | VanPutten |
| 6,129,003 A | 10/2000 | Udagawa |
| 2015/0184443 A1 | 7/2015 | Sakai et al. |
| 2022/0178424 A1 | 6/2022 | Sessions |

FOREIGN PATENT DOCUMENTS

| | | |
|---|---|---|
| DE | 2939153 | 4/1981 |
| DE | 2939153 C2 | 12/1983 |
| DE | 3731073 | 3/1989 |
| DE | 102004012408 | 9/2005 |
| NL | 8503458 | 7/1987 |

OTHER PUBLICATIONS

Zero-Max.com [online], "Product Catalogue: Roh'Lix® Linear Actuators," retrieved on Jul. 6, 2023, retrieved from URL<https://www.zero-max.com/documents/Zero-Max%20Rohlix%20Catalog.pdf>, 6 pages.
International Search Report and Written Opinion in International Appln. No. PCT/US2024/035196, mailed on Oct. 24, 2024, 19 pages.

*Primary Examiner* — Matthew Wiblin
(74) *Attorney, Agent, or Firm* — Fish & Richardson P.C.

(57) ABSTRACT

This disclosure describes techniques for a self-aligning system within a belt-driven linear actuator that enables a "keyless" or "round profile" piston to be sealed while maintaining an aligning and/or torque resisting ability. This enables the airspaces within the electromechanical actuator could be pressurized to perform a secondary load holding function that is redundant to the linear screw device.

17 Claims, 12 Drawing Sheets

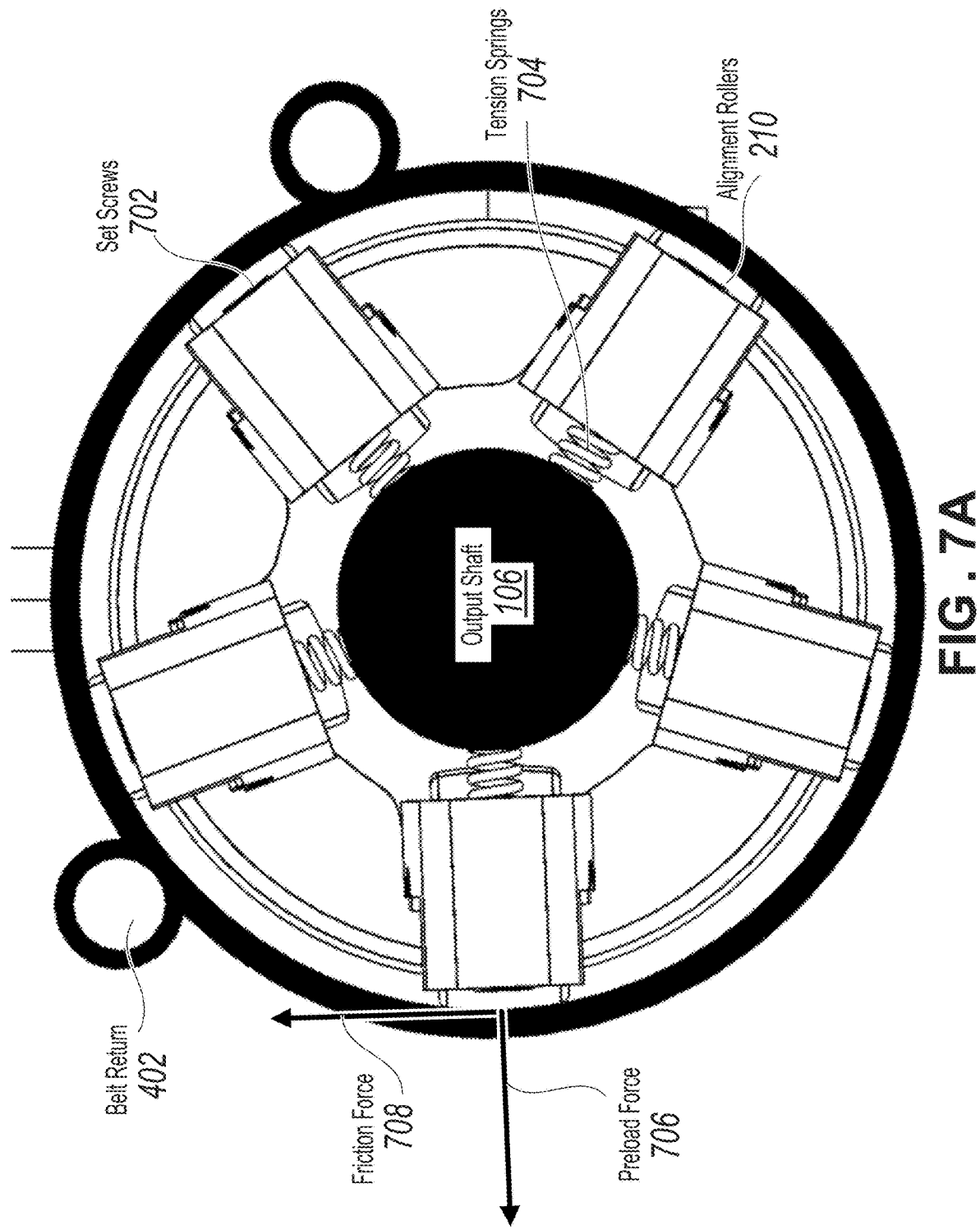

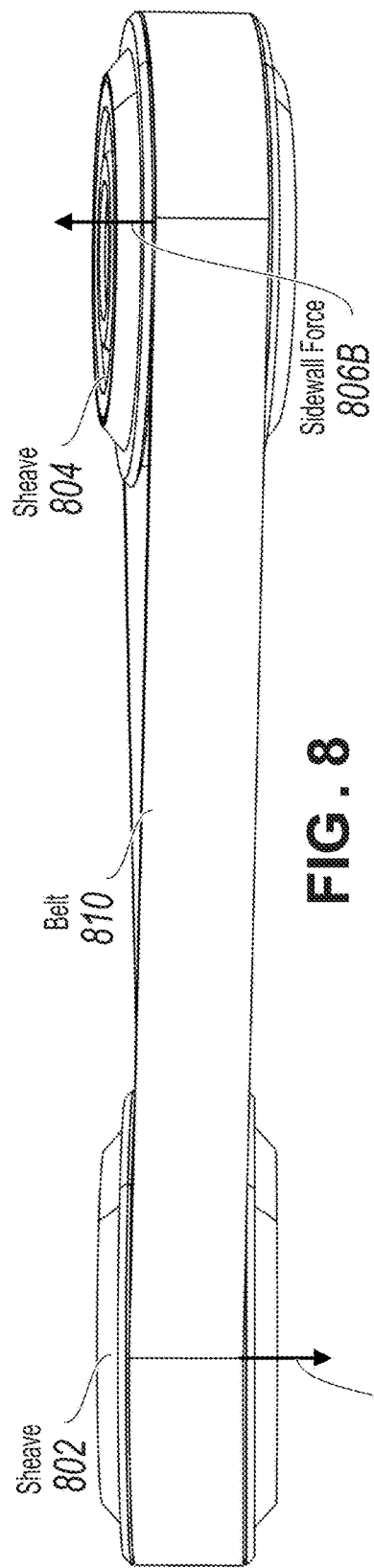
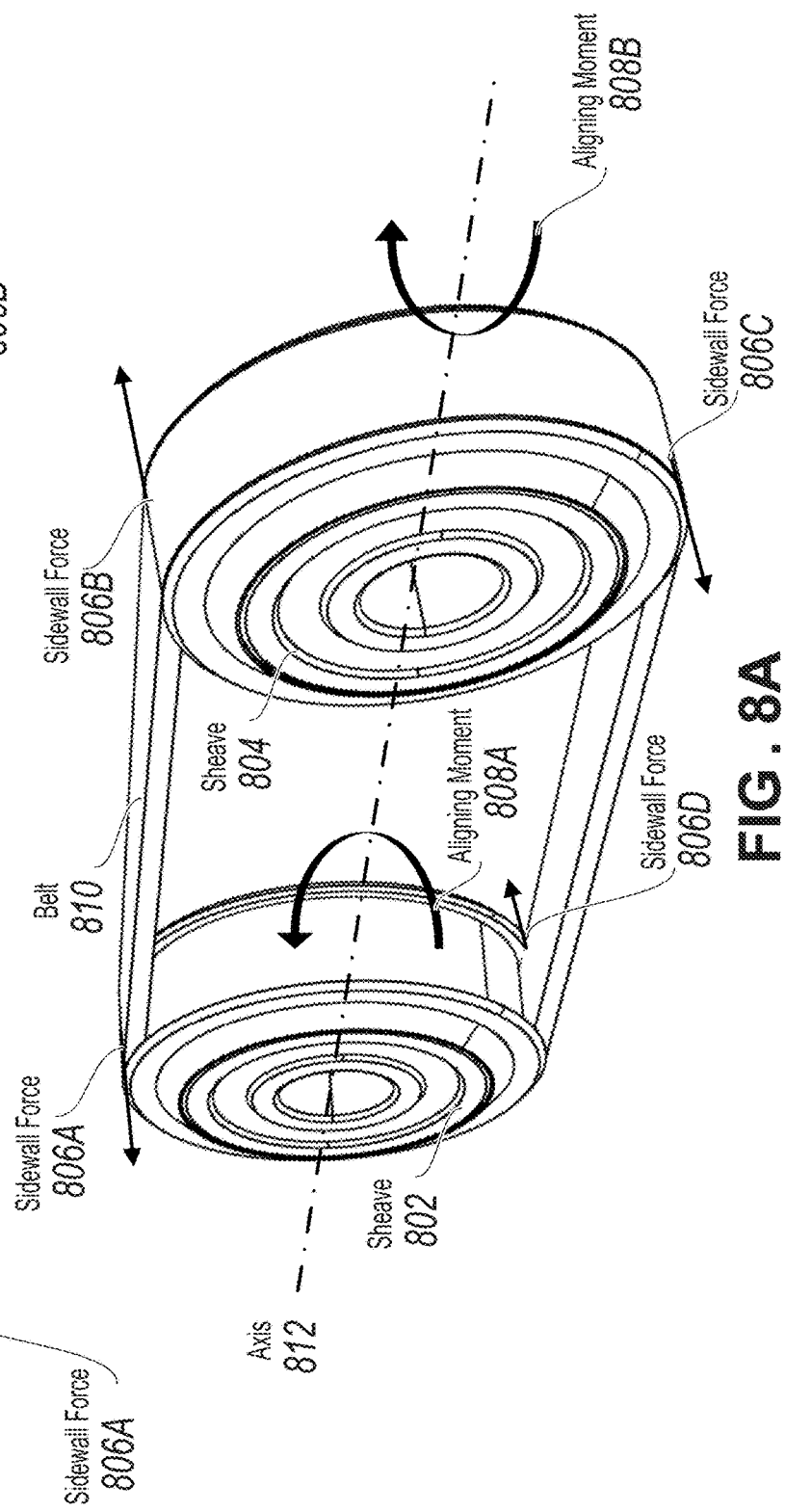

PNEUMATIC OPERATION AND SELF-ALIGNMENT OF LINEAR ACTUATOR

CROSS REFERENCE TO RELATED APPLICATION

This application is a continuation of U.S. Ser. No. 18/217,360, filed Jun. 30, 2023, the contents of which are hereby incorporated by reference in its entirety into this application.

TECHNICAL FIELD

This disclosure generally relates to a self-aligning, belt-driven linear actuator that includes a pneumatic backup operation functionality.

BACKGROUND

Modern belts have many desirable characteristics. They can be lightweight, low-maintenance, and have high strength under tension. Many new and old applications of modern belts are currently being adapted. Linear actuators are often used to manipulate sensitive, heavy, or dangerous loads. Emergency hold and backup operation can be an important capability for certain applications.

SUMMARY

In general, the disclosure involves systems and methods for pneumatically operating and self-alignment of a belt-driven linear actuator. The alignment system can include an actuator chassis having an inner surface, a traveling assembly that includes an operating piston and an output shaft. The traveling assembly can be configured to translate along a primary axis defined by a centerline of the output shaft. A roller can be rotatably coupled to the traveling assembly and configured to mechanically engage with the inner surface of the actuator chassis, the roller including an axis of rotation that is perpendicular to the primary axis. A first flanged sheave can be coupled to the output shaft and a second flanged sheave can be coupled to the actuator chassis and a belt can extend between and around the first and second sheaves.

The alignment system optionally includes one or more of the following features.

In some instances, the roller is engaged with the inner surface by a spring, and the spring is pre-loaded by a set screw.

In some instances, the first flanged sheave and the second flanged sheave operate as a pulley system configured to translate the output shaft along the axis.

In some instances, the roller has a curved surface shaped to maximize a contact area between the roller and the inner surface.

In some instances, the roller permits rotation of the output shaft and affixed components about the primary axis in a range of 0.1-1 degrees of rotation per meter of travel.

In some instances, the roller is one of a plurality of rollers, and the plurality of roller form an annular arrangement that at least partially encloses the output shaft.

This disclosure further includes a method of operating a belt-driven linear actuator, the method including translating a traveling assembly of the belt-driven linear actuator and, while translating the traveling assembly, allowing the traveling assembly to rotate about a primary axis to maintain alignment of a belt between a first sheave and a second sheave.

The method optionally includes one or more of the following features.

In some instances, the method includes preventing rotation about the primary axis when the traveling assembly is not translating. This prevention can include frictionally resisting rotation using one or more members affixed to the traveling assembly and mechanically engaged with an inner surface of an actuator chassis by one or more preloaded springs.

In some instances, the linear actuator includes an actuator chassis with an inner surface and the traveling assembly includes an operating piston and an output shaft that translates along the primary axis, where the primary axis is defined by a centerline of the output shaft. In some instances the linear actuator comprises a roller rotatably coupled to the traveling assembly and configured to mechanically engage with the inner surface of the actuator chassis, the roller having an axis of rotation that is perpendicular to the primary axis.

In some instances, the first sheave and the second sheave are flanged sheaves, and the first sheave is coupled to the traveling assembly and the second sheave is coupled to an actuator chassis.

This disclosure further describes a pneumatically operated belt-driven linear actuator. The system includes a pneumatically operated system and an alignment system. The pneumatically operated system includes a proximal volume, a distal volume, an operating piston affixed to an output shaft of the linear actuator, the operating piston separating the proximal and distal volumes, and a valve configured to direct gas to the proximal or distal volume, thereby creating a differential pressure across the operating piston. The alignment system is configured to maintain rotational alignment of the output shaft of the linear actuator, and includes an actuator chassis having an inner surface, a roller rotatably coupled to a traveling assembly and configured to mechanically engage with the inner surface of the actuator chassis. The roller has an axis of rotation that is perpendicular to the primary axis defined by a centerline of the output shaft. The alignment system further includes a first flanged sheave coupled to the output shaft, a second flanged sheave coupled to the actuator chassis, and a flat belt extending between and around the first and second sheaves.

The system optionally includes one or more of the following features.

In some instances, the roller is engaged with the inner surface by a spring that is pre-loaded by a set screw.

In some instances, the first flanged sheave and the second flanged sheave operate as a pulley system configured to translate the operating piston along the primary axis.

In some instances, the roller has a curved surface shaped to maximize a contact area between the roller and the inner surface.

In some instances, the valve is a three-way valve that is selectable to direct gas to either the proximal or the distal volumes.

In some instances, the system includes an isolation valve configured to, when opened, initiate flow of gas, and a controller configured to receive information associated with the operating load of the linear actuator and align the three-way valve to direct gas to oppose the operating load. In some instances, the controller adjusts the amount of pressure supplied by the isolation valve to match the differential pressure across the operating piston with the operating load.

Safety critical applications within the Off-Highway Heavy Machine industry often involve linear actuators that are used to manipulate sensitive, heavy, or dangerous loads. These can require a secondary method of load holding in addition to a method of safely moving the load into a desired physical state, even with damaged power transmission components or the absence of electrical power. Conventional fluid power systems often incorporate pipe rupture valves that are open during normal operation and close if high flow rates occur, locking the cylinder and preventing further movement. This prevention occurs without relying on most of the hydraulic circuit. From this locked state, fluid can then be bled through a throttle valve or pumped into the cylinder via a backup pump device according to widely accepted engineering principles, permitting slow and safe movement of the cylinder system into a desired physical configuration for recovery and repair. In contrast, electromechanical actuators driven by ball screw or roller screw devices fall short of this recovery requirement. While some incorporate a locking device that may seize the linear screw device in the event of a powertrain failure upstream of the linear screw device (in the gearbox or the motor, for example), there exists only a limited ability to carefully adjust the output position of an electromechanical actuator, typically via an externally applied torque that is directed to a manual override on the linear screw device (via a hand crank, for example) that bypasses the primary torque transmission path. This may work in limited circumstances, but the technique is not widely applicable to Off-Highway Heavy Machine applications for many reasons, three of which will be discussed here.

First, it requires direct physical access to the electromechanical actuator in order to move or modify the output position. This can often be impractical or impossible, depending on where the actuator resides within the machine chassis and whether an operator is able to physically access the actuator that is still under load in the context of the machine. Even if physical access to a manual override location is present, the torque required to drive the screw device can be exceedingly high, well beyond an individual operator's ability to manually generate that torque with hand tools, requiring a secondary mechanical device to generate the torque to move the actuator position. Second, this principle only applies to machine degrees of freedom that are driven by a single actuator. If two actuators drive the same machine degree of freedom and share load equally during operation, they need to be manually operated (via the manual override) in a synchronous manner as well, which can be difficult to impossible. By contrast, fluid from a paired set of fluid power cylinders can be bled at the same time, ensuring even loading between the cylinders throughout the recovery process. Third, any mechanism that locks a linear screw device will operate only if the linear screw device itself is still nominally operational. As such, any failure mode that includes severe damage to the load bearing elements of the linear screw device may not be recoverable with a manual override mechanism.

Turning now to the topic of angular alignment between the output shaft (also commonly called a piston rod) and cylinder body of an actuator in its working context, several facts can be stated about fluid power cylinders and electromechanical actuators. Fluid power cylinders contain components (output shaft, piston head, seals, etc.) that are rotationally symmetric and permit any arbitrary angular alignment that is imposed upon the pair of working components (output shaft and cylinder) by the external system. For example, as an excavator boom swings left and right, backlash within the linkage bushings and compliance of the structural arm components will together cause small shifts (e.g., around 1 degree) in relative angular alignment at the cylinder rod end locations. This can be accommodated directly within a fluid power cylinder with standard rod end/clevis components since angular rotation is permissible between the rod and cylinder. It can also be managed by a spherical joint at either end of the device to externalize that rotation to minimize scoring of the cylinder wall and other asymmetric load conditions.

Some configurations of electromechanical actuators driven by ball screw or roller screw mechanisms can also accommodate externally forced shifts in angular alignment, but they also have an inherent requirement for a response torque that needs to be applied to the output shaft component that resists its rotation, or else it will spin and travel freely. This response torque can be provided in one of three conventional ways: Externally via the rod end location, externally via an anti-rotation device, or internally via an integrated anti-rotation device. The first option is highly undesirable because it requires a torque from the rod end interface, amplifying the loads at that pivot location with a standard rod end or clevis and disallowing the integration of a standard spherical joint, which would rotate and shift wildly during operation. The second way to convey a response torque to the output shaft component is via an external anti-rotation device, which often manifests as a linear rail type device that bears torsion through its length and to a linear bushing that runs alongside the output shaft component. This solution is valid in a controlled manufacturing environment but is also highly undesirable in an Off-Highway Heavy Machine application since it subjects additional sensitive and bulky linear rail components to the environment and consumes additional space that might not be available. The third way to convey a response torque to the output shaft is via an integrated anti-rotation device, which takes the form of a "keyed" geometry that is typically present between the driven nut and the housing of the device. This interface is subject to substantial torque, since, neglecting friction, the response torque provided by the keyed interface must match the screw drive torque under steady state operation. The benefits of this arrangement are clear: All of the working components within the electromechanical actuator are shielded from the environment behind the primary rod seal, and since an external torque does not need to be applied to the output shaft, a spherical joint that accommodates misalignment can be used at one of the two ends of the actuator. There are two drawbacks to the integrated anti-rotation device, however. First, it adds to the bulk of the device, since the keyed geometry consumes additional space. Second, either a positive or negative key feature must be present in the housing cross section. The presence of the key in the cross section disallows the incorporation of a standard (round profile) dynamic piston head seal that would otherwise be able to provide sealing action between the traveling components and the housing.

Techniques in this disclosure discuss a self-aligning system that enables a "keyless" or "round profile" piston to be sealed while maintaining an aligning and/or torque resisting ability. This enables the airspaces within the electromechanical actuator could be pressurized to perform a secondary load holding function that is redundant to the linear screw device. In general, the disclosed device is an electro-mechanical linear actuator that is not driven by a ball screw or roller screw device, and instead uses a flexible belt in a block and tackle arrangement.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

To describe technical solutions in the implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

FIG. 7A is a partial cutaway diagram of an operating piston with alignment rollers.

FIG. 8 is a top view of an example pair of misaligned sheaves engaged with a belt.

FIG. 8A is a perspective view of the example pair of misaligned sheaves engaged with a belt.

Like reference numbers and designations in the various drawings indicate like elements.

DETAILED DESCRIPTION

This disclosure describes a self-aligning system that enables a "keyless" or "round profile" piston to be sealed while maintaining an aligning and/or torque resisting ability. This enables the airspaces within the electromechanical actuator could be pressurized to perform a secondary load holding function that is redundant to the linear screw device.

To help a person skilled in the art better understand the technical solutions in the present specification, the following clearly and comprehensively describes the technical solutions in the implementations of the present specification with reference to the accompanying drawings in the implementations of the present specification. Apparently, the described implementations are merely some rather than all the implementations of the present specification. All other implementations obtained by a person of ordinary skill in the art based on one or more implementations of the present specification without creative efforts shall fall within the protection scope of the implementations of the present specification.

Figure 1:
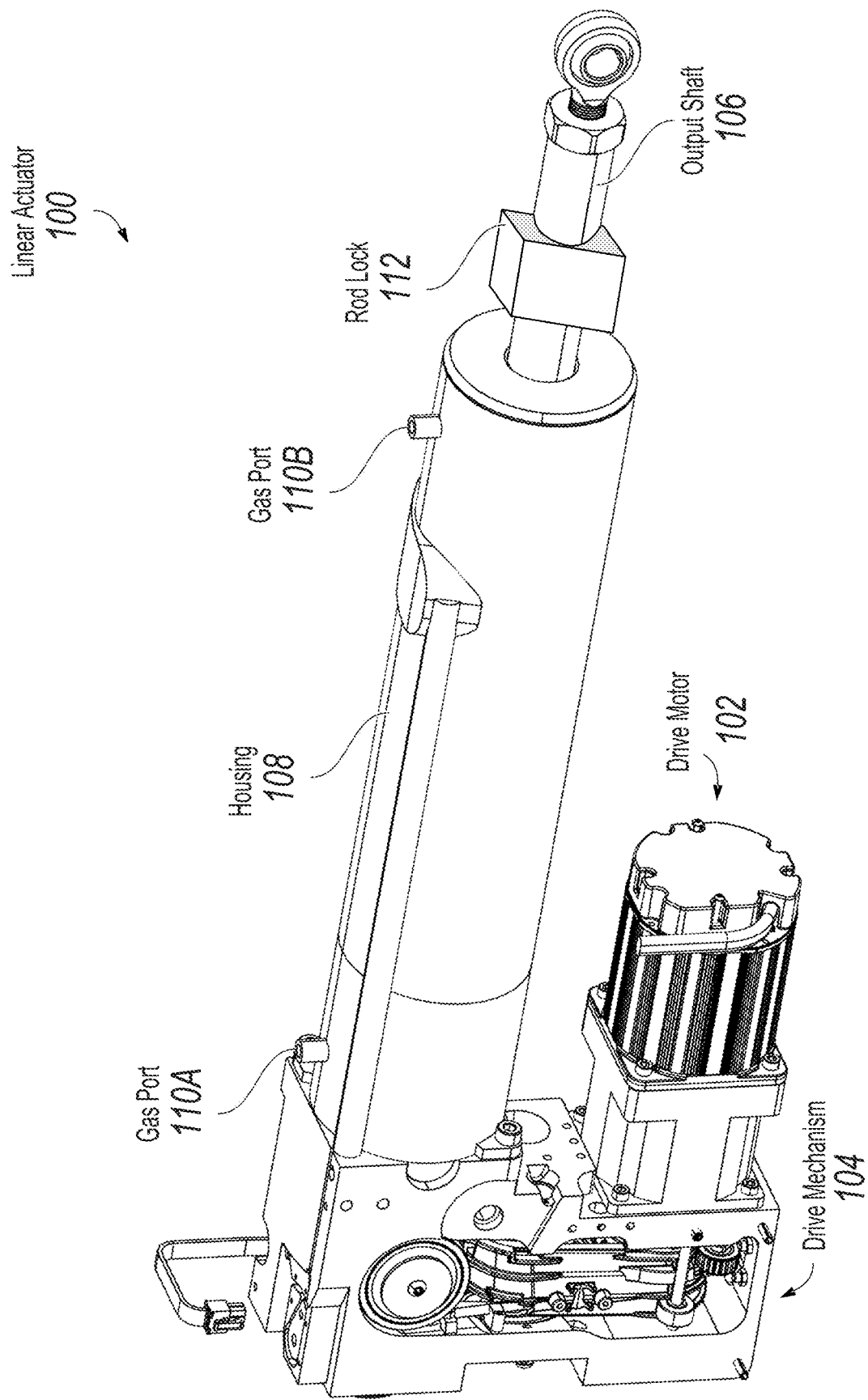
FIG. 1 is a perspective view of a belt-driven linear actuator that includes pneumatic operation functionality.

FIG. 1 is a perspective view of a belt-driven linear actuator 100 that includes pneumatic operation functionality. The illustrated linear actuator 100 includes a housing 108 that has two gas ports 110A and 110B. A drive motor 102 operates a drive mechanism 104 which moves output shaft 106 in a linear fashion. Gas ports 110A and 110B can be used to pressurize portions of the interior of linear actuator 100 as described in more detail below.

During normal operation, the drive motor 102 converts electrical energy to mechanical energy which, in turn, is converted into movement of output shaft 106 via drive mechanism 104. However, if there is an electrical failure or an internal mechanical failure within linear actuator 100, back-up pneumatic operation can be employed. In general, linear actuators can be used to lift or actuate large loads, often against external forces (e.g., gravity, drag, etc.). For safety, certain implementations may require the presence of redundant load holding and backup operation functionality. Further, it is beneficial for the system to include safety features that prevent un-commanded or inadvertent movement of linear actuator 100 if a fault condition is triggered.

A pneumatic system can pressurize various internal volumes of linear actuator 100 and provide pneumatic operation, including the arresting of movement, load manipulation, and controlled unloading of linear actuator 100. In the implementation illustrated in FIG. 1, a rod lock mechanism 112 is installed to provide additional movement arresting capability. It should be noted that while two gas ports 110A and 110B are illustrated, in some implementations, only a single gas port is necessary. In general, this disclosure discusses implementing pneumatic operation on a double acting, or push-pull type linear actuator. However, in many implementations, linear actuators are configured to operate with a load in a single direction (e.g., "compression only" or "tension only"). For these single acting devices, a single gas port may be suitable.

Rod lock 112 can be a frictional device that mechanically prevents output shaft 106 from moving. For example, rod lock 112 can include a collar and a set of translating shims that cause the collar to squeeze output shaft 106, thereby arresting a dynamic movement and holding load in a static condition. Rod locking mechanisms are available commercially and include, for example, the Nexsafe rod lock, the Amlok lock, or the SITEMA safety brake. Rod lock 112 can be electrically, pneumatically, or hydraulically operated, and can be configured to automatically stop or arrest output shaft movement in the event of certain failures such as a loss of electrical power, loss of pressure, or other electrical trigger (e.g., loss of belt reinforcement continuity measured within a belt of a belt-driven linear actuator).

Figure 2:
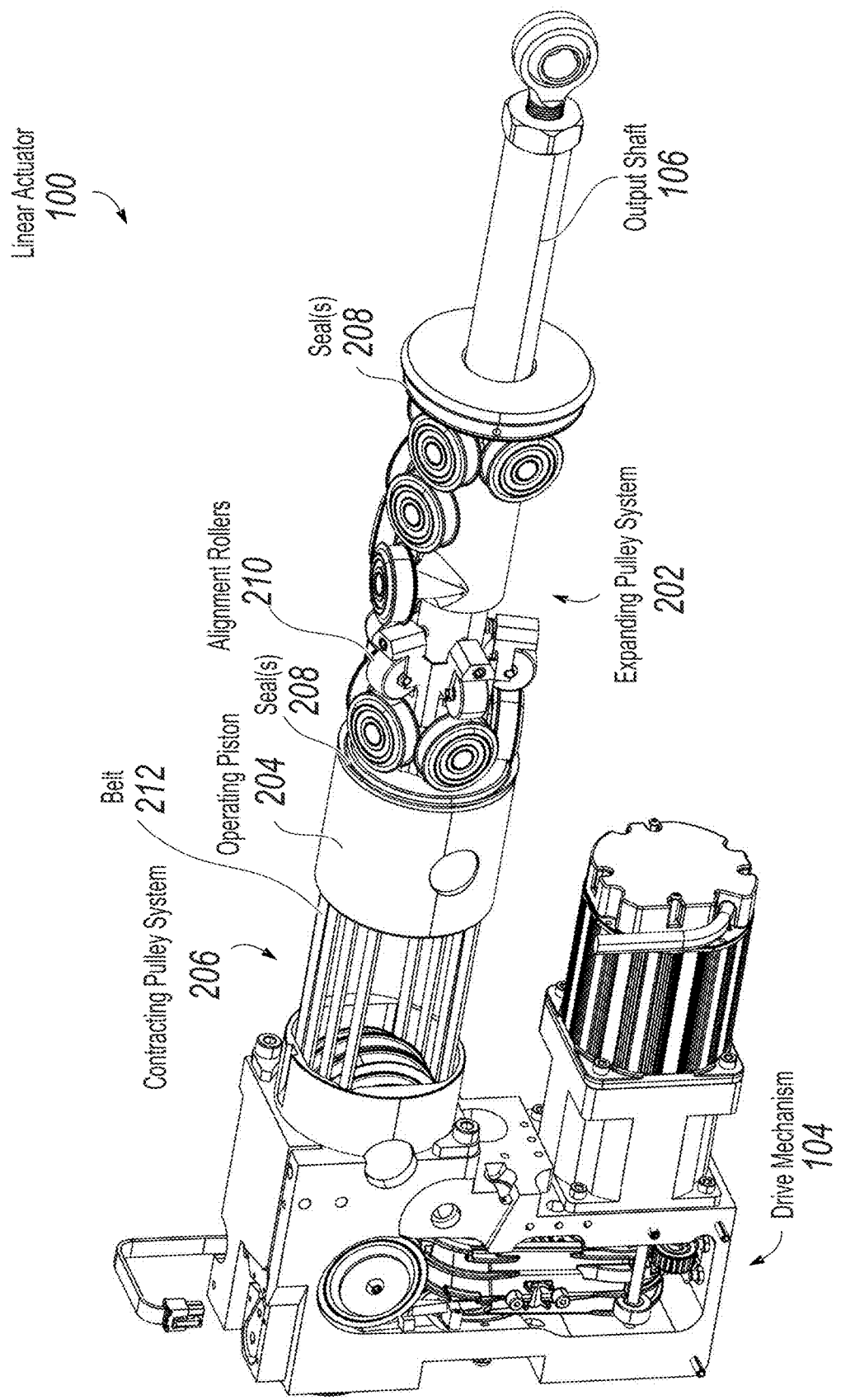
FIG. 2 is a perspective view of the belt-driven linear actuator of FIG. 1 with the outer housing removed to show certain internal components.

FIG. 2 is a perspective view of the belt-driven linear actuator 100 of FIG. 1 with the outer housing removed to show certain internal components. Other structural components have been removed for clarity. For example, only a portion of belt 212 is illustrated, with the portion in expanding pulley system 202 removed for clarity. A more complete depiction of the topology of belt 212 is described below with respect to FIG. 6.

Linear actuator 100 is normally operated using a belt 212. Belt 212 can be formed from two or more wire ropes run in a parallel arrangement and jacketed in a polyurethane or other sheath material. This material arrangement can enable a high strength and high durability belt that can withstand repeated bending and tensile stresses as it is run over relatively small diameter sheaves. In some implementations, the wire ropes within belt 212 can be pre-tensioned in a non-uniform manner to increase the twist and fleet angle tolerance of belt 212.

In the illustrated embodiment linear actuator 100 is a double action linear actuator, and belt 212 is arranged in an opposed block and tackle topology. Drive mechanism 104 is configured to extract belt from one pulley system and pay it out to the other. For example, when drive mechanism 104 rotates one way, belt 212 is withdrawn from expanding pulley system 202, and paid out to contracting pulley system 206, causing operating piston 204 and output shaft 106 to translate to the right, extending linear actuator 100. Conversely, if drive mechanism 104 rotates the other way, belt 212 is withdrawn from contracting pulley system 206 and paid out to expanding pulley system 202, causing operating piston 204 and output shaft 106 to translate to the left, contracting linear actuator 100.

Operating piston 204 is affixed to output shaft 106 and provides a structural member for mounting traveling sheaves from both contracting pulley system 206 and expanding pulley system 202. Operating piston 204 is coupled to output shaft 106 and translates within the housing (e.g., housing 108 of FIG. 1). One or more seals 208 can seal different volumes within the interior of linear actuator 100 and enable elective pressurization or a differential pressure to be generated across operating piston 204 to provide pneumatic operation.

A set of alignment rollers 210 are affixed to operating piston 204 and engage with the outer housing (e.g., housing 108 of FIG. 1). Alignment rollers 210 are discussed in more detail below with respect to FIG. 7. In general, the alignment rollers 210 resist rotational forces, and minimize the amount of rotation that operating piston 204 and output shaft 106 undergo when traveling in linear actuator 100.

Figure 3:
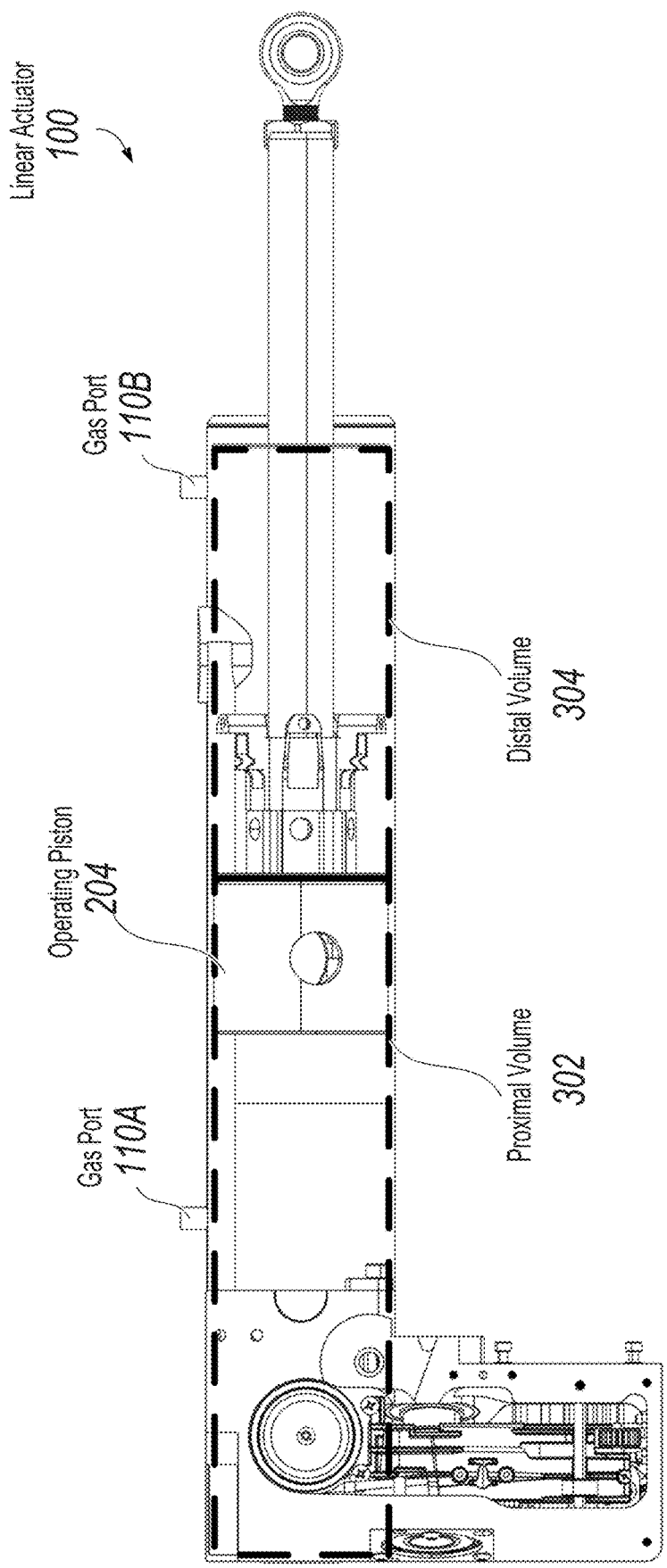
FIG. 3 is a partial cut-away side view of the belt-driven linear actuator of FIG. 1 that includes pneumatic operation functionality.

FIG. 3 is a partial cut-away side view of a belt-driven linear actuator that includes pneumatic operation functionality. Operating piston 204 divides the interior of linear actuator 100 into two volumes, proximal volume 302 and distal volume 304.

During pneumatic operation, to arrest movement caused by an expanding load, distal volume 304 can be pressurized, creating a resisting force, and preventing or reducing expansion of linear actuator 100. Similarly, movement caused by a contracting load can be arrested by pressurizing proximal volume 302. Alternatively, if motion is required (e.g., an expanding motion), then the appropriate volume can be pressurized to cause motion. In applications where pneumatic operation is used as an emergency hold or a backup operation, linear actuator 100 can be returned to a resting state by slowly bleeding pressure from a pressurized volume. This will, for example, allow a load that has been lifted by linear actuator 100 to slowly lower until linear actuator 100 is fully contracted (or expanded).

Figure 4:
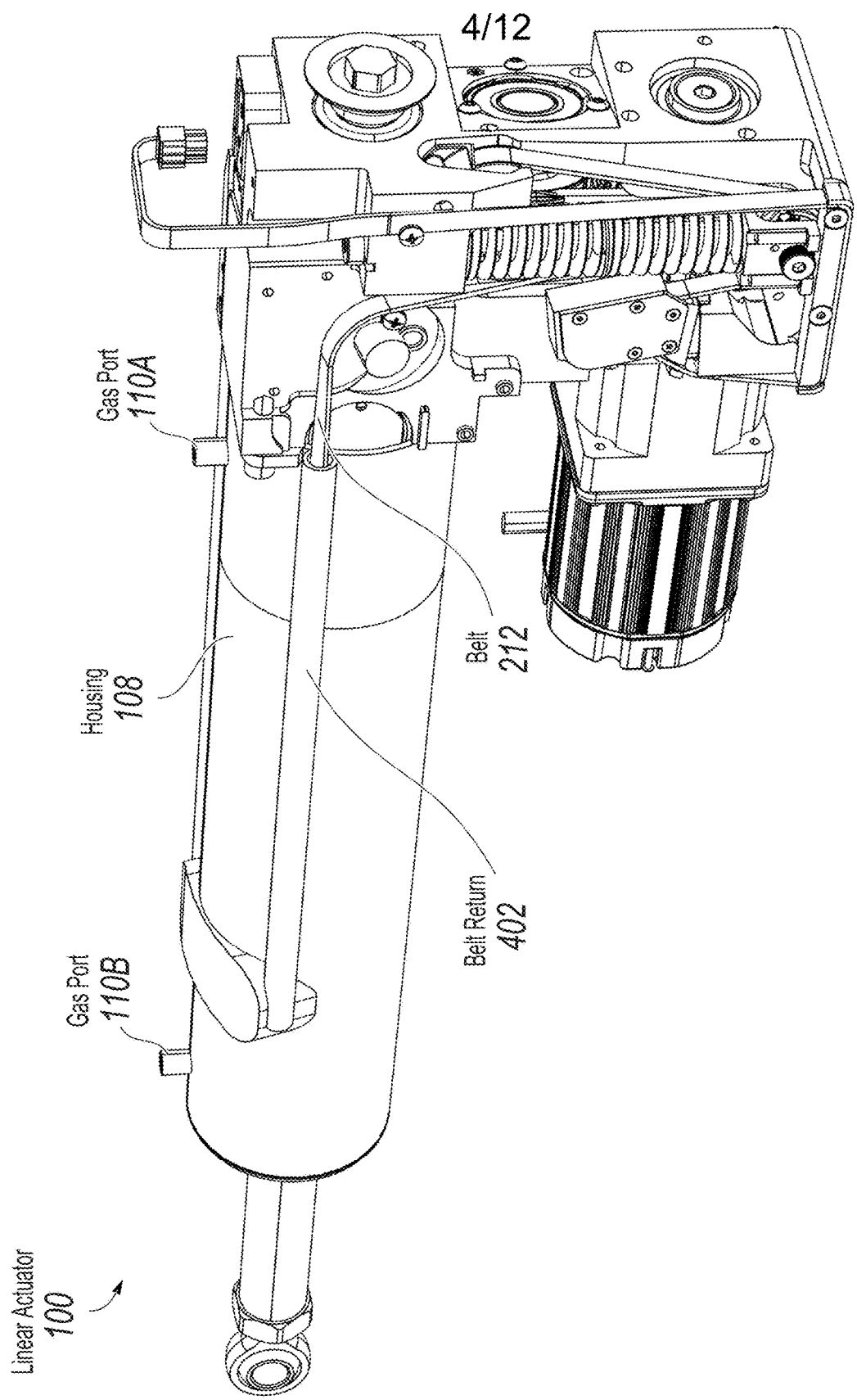
FIG. 4 is a perspective view of the belt-driven linear actuator of FIG. 1 illustrating a belt return.

FIG. 4 is a perspective view of a belt-driven linear actuator illustrating a belt return 402. In implementations where linear actuator 100 is double acting, belt transfers between proximal volume and distal volume, or expanding pulley system and contracting pulley system. In the illustrated example, belt 212 is passed via a "hardline" external to housing 108. This "hardline" can act as a bypass during normal operation, allowing gas to flow freely between proximal volume and distal volume. One or more pinch valves can be installed in the belt return 402 to seal off the hardline in the event either distal volume or proximal volume needs to be pressurized.

Pinch valves can include a diaphragm, or in some implementations, multiple diaphragms that flex and seal around belt 212 when the pinch valve is engaged. In some implementations, the pinch valve can allow limited movement of belt 212 through the pinch valve while maintaining a sufficient seal to ensure pressure in the pressurized volume is maintained. In some implementations, the pinch valve includes a flexible tube that encircles the belt (e.g., belt 212 of FIG. 2), and when actuated, a piston or ring deforms the tube to form a seal around belt 212. In some implementations, the pinch valve is electrically operated. In some implementations, the pinch valve is pneumatically operated. For example, if pressurizing gas is detected by a sensing line of the pinch valve, the pinch valve can automatically close, pneumatically separating distal and proximal volumes.

Figure 5:
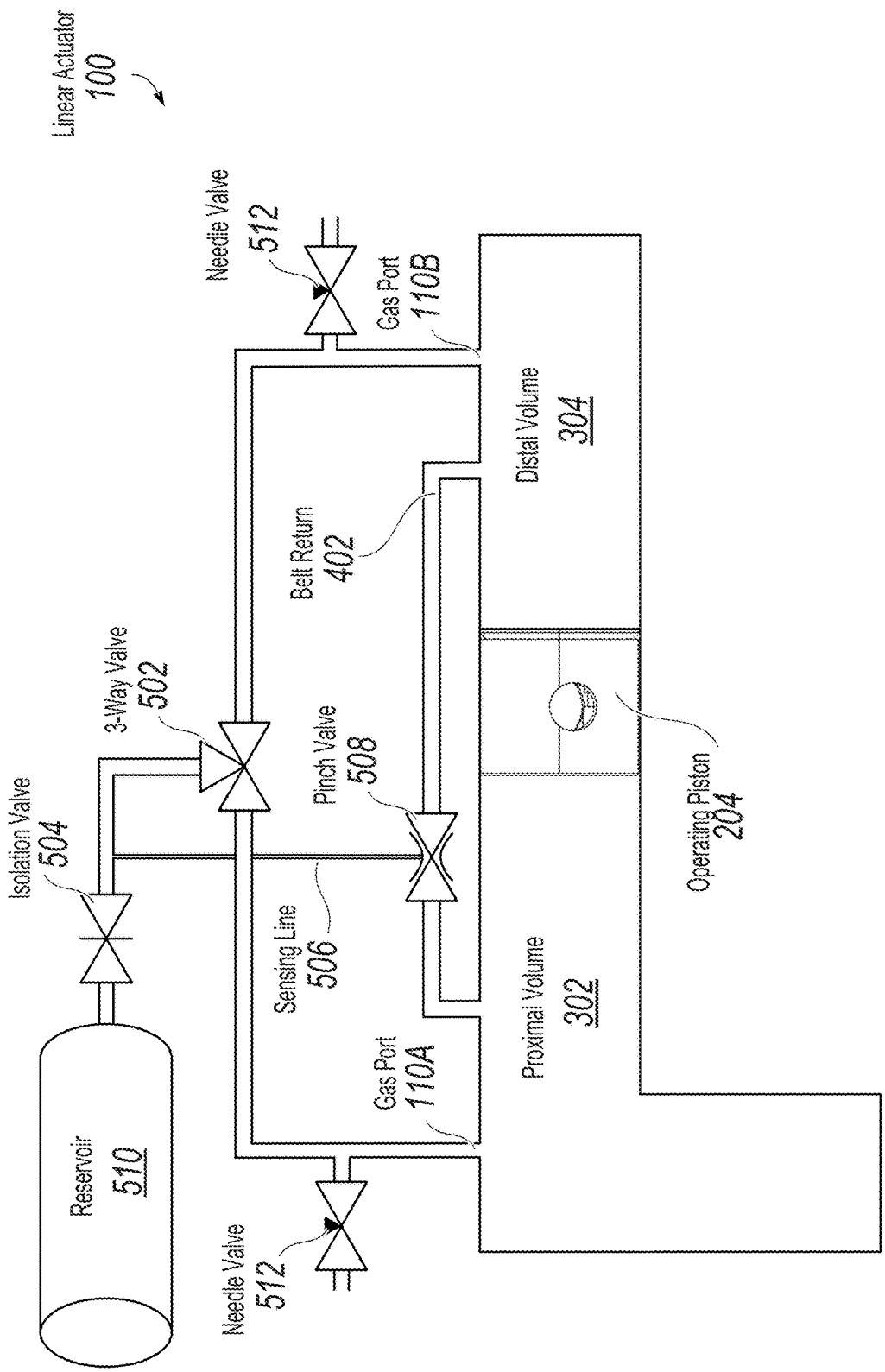
FIG. 5 is a schematic diagram of a pneumatic system for pneumatically operating a belt-driven linear actuator.

FIG. 5 is a schematic diagram of a pneumatic system for pneumatically operating the belt-driven linear actuator 100. FIG. 5 illustrates proximal volume 302 and distal volume 304 separated by operating piston 204.

During normal operation, belt return 402 can act as an equalizing line, allowing pressure to equalize across operating piston 204. In the illustrated implementation, three-way valve 502 also provides a flow path between proximal volume 302 and distal volume 304, further equalizing pressure. In some implementations, no equalizing line is provided, and relatively small differential pressures occur across operating piston 204 as it moves throughout its normal range of motion. With one or more equalization air pathways open, the pressure in both proximal volume 302 and distal volume 304 may still fluctuate as actuator contraction and extension occurs due to volume displacement caused by the output shaft 106 retracting into the housing 108.

Three-way valve 502 can be a ball valve or other valve that can have multiple positions and be configured to selectively direct air to either proximal volume 302 or distal volume 304. In some implementations, three-way valve 502 can have four positions, such as a "TO DISTAL" position, "TO PROXIMAL" position, "BYPASS" position, and "SHUT" position. In some implementations, three-way valve 502 has three positions or two positions. In general, three-way valve 502 can direct high energy or pressurized gas that is released by isolation valve 504, to the appropriate volume in order to arrest motion or counter the force generated by the operating load of linear actuator 100. In some implementations, three-way valve 502 is electronically actuated, e.g., via a motor or a solenoid. In some implementations, a controller is configured to monitor the working load on linear actuator 100 and direct three-way valve 502 as necessary to align a flow path toward the volume that will oppose the working load. In the event of a system failure, isolation valve 504 can be opened, and gas will be immediately directed to the appropriate volume, providing resistance and arresting motion caused by the operational load.

Isolation valve 504 can be a gate valve or a throttle valve, or other suitable valve for isolating a high-pressure gas until it is needed to pressurize either proximal volume 302 or distal volume 304. In the illustrated example, reservoir 510 provides a storage volume for high pressure gas. In some implementations, a pump is used instead of a reservoir. That is, in some implementations, the high-pressure gas is generated on demand when a fault is detected.

Figure 5A:
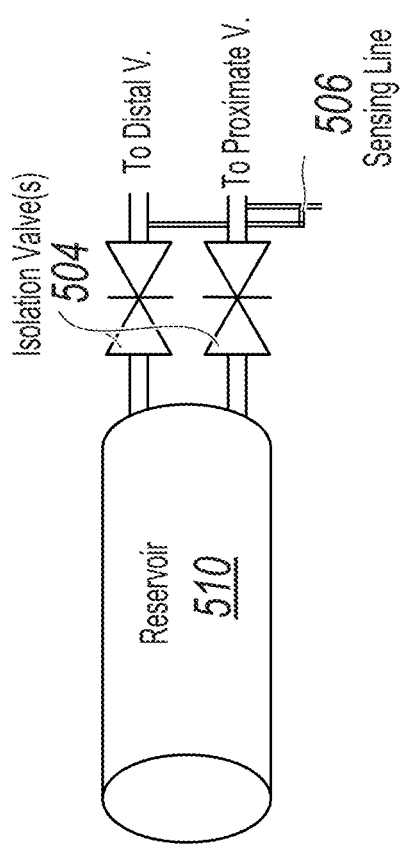
FIG. 5A illustrates an alternate supply layout of the pneumatic system of FIG. 5.

FIG. 5A illustrates an alternate supply layout of the pneumatic system of FIG. 5. Instead of a three-way valve, twin isolation valves are used, each directing gas to a particular volume. In either FIG. 5 or 5A, isolation valve 504 can be pneumatically operated, or solenoid operated, among other things. For example, isolation valve 504 can be maintained shut by an electrical power signal and configured to automatically spring open in a loss of power event.

Returning to FIG. 5, pinch valve 508 provides isolation between proximal volume 403 and distal volume 304 when one volume is to be pressurized. In some implementations pinch valve 508 is automatically shut when high pressure gas flows in via sensing line 506. In some implementations, pinch valve 508 is electronically shut (e.g., by the same signal that triggers opening of isolation valve 504). Pinch valve 508 can be, for example, a valve similar to an AKO VMC pinch valve, or a Schubert & Salzer type 7069. In some implementations, pinch valve 508 can seal or mostly seal around a belt and maintain a differential pressure of 200 to 1000 pounds per square inch.

Needle valves 512 can be provided along the supply lines to enable controlled depressurization of either proximal volume 302 or distal volume 304. In some implementations, needle valves 512 are manually operated. In some implementations, needle valves 512 are electrically operated, or static valves configured to slowly leak over time. If a pneumatic arresting event occurs within linear actuator 100 such as a belt failure while a load is suspended, needle valves 512 can enable an operator to lower the load safely and slowly to a resting position.

Figure 5B:
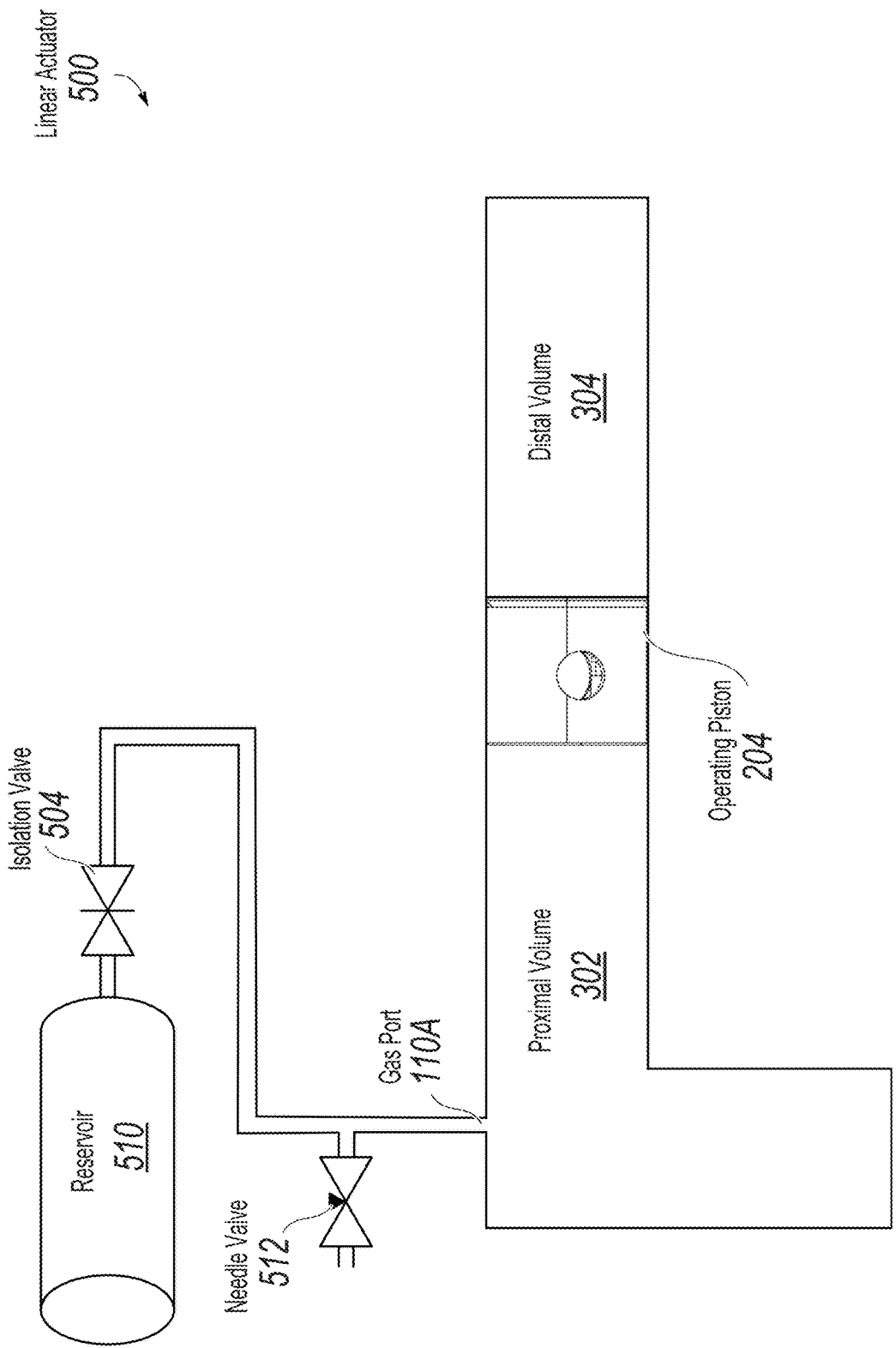
FIG. 5B is a schematic diagram of a pneumatic system for pneumatically operating single action belt-driven linear actuators.

FIG. 5B is a schematic diagram of a pneumatic system for pneumatically operating single action belt-driven linear actuator 500. Linear actuator 500 differs from the previously illustrated linear actuator 100 in that it is configured to operate in with an operating load that acts in a single direction. In the illustrated example, linear actuator 500 is a "compressive" actuator, or an actuator that is configured to extend under power and retract under an externally applied compressive load, with a compressive load present in the output shaft 106 in both directions. This configuration is simplified in that only a single volume (e.g., proximal volume 302) will need to be pressurized. A single flow path, isolated isolation valve 504 is sufficient to enable pneumatic operation against the operational loads. Because the single action linear actuator 500 does not have a belt return, no pinch valve 508 is necessary.

Figure 6:
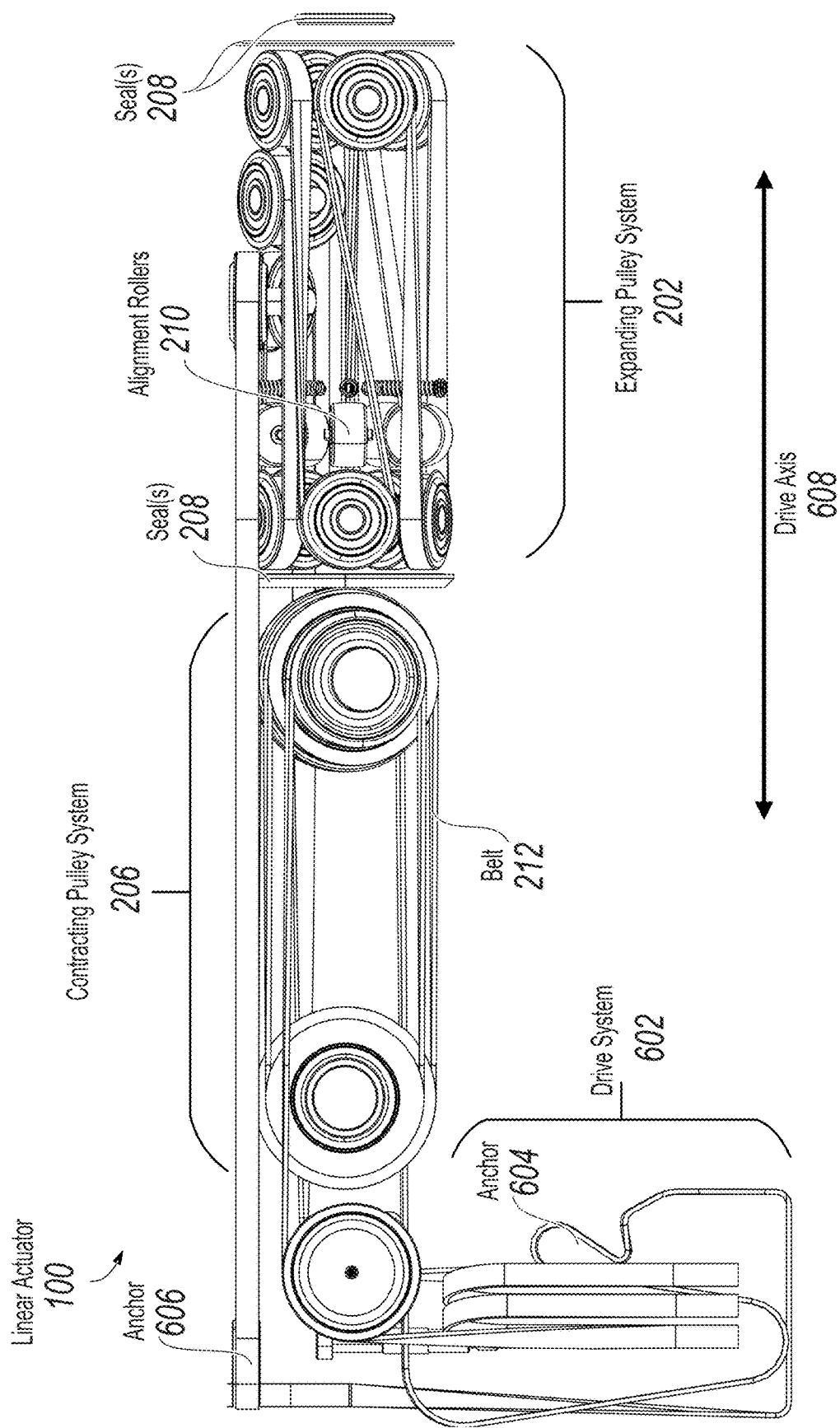
FIG. 6 is a side view of some select components of the belt-driven linear actuator of FIG. 1 showing belt topology.

FIG. 6 is a side view of some select components of a belt-driven linear actuator showing belt topology. Belt 212 passes from a first anchor 604 into contracting pulley system 206, which includes a number of fixed sheaves and a number of traveling sheaves and can operate to contract linear actuator 100. Belt 212 then passes into drive system 602 which can move belt 212 within linear actuator 100. Belt then passes from the drive system 602 into expanding pulley system 202 (via belt return 402 illustrated in FIG. 4) and passes through expanding pully system 202 before terminating at anchor 606. It should be noted that in implementations where there are not opposing pulley systems, there may be a reeling mechanism configured to take in additional belt as it is removed from the operating pulley system (either contracting pulley system 206 or expanding pulley system 202).

To provide an effective seal between contracting pulley system 206 and expanding pulley system 202, dynamically operating seals 208 preferably have a circular, or annular form. That is, the operating structure and housing within which this belt system operates can be cylindrical, with a smooth interior shape. However, the output shaft (e.g., output shaft 106 as described in FIG. 1) and thus the traveling sheaves of both contracting pulley system 206 and expanding pulley system 202 may experience twisting or misaligning forces during operation if angular alignment between the actuator chassis and the output rod is not controlled. Were the output shaft to significantly rotate or twist, the misalignment of the internal pulley systems (202 and 206) would cause rapid belt degradation, and early failure of linear actuator 100. Therefore, a system that maintains pulley alignment to within 0.15 degrees and resists externally applied twisting moments is desired.

Conventional anti-rotation systems use a keyway and lug, or a slot and track system. This disclosure describes an anti-rotation and self-alignment system that does not require a keyway or lug, and thus enables use of circular or cylindrical seals, such as seals 208. Further, the disclosed system does not require any external support or structure, and thus does not alter the overall footprint of linear actuator 100. A set of alignment rollers 210 are provided, which are radially preloaded to engage with the inner surface of a cylindrical outer housing (e.g., housing 108 of FIG. 1). The alignment rollers resist rotation movement of the traveling assembly (e.g., the output shaft 106 and operating piston 204) about the drive axis 608.

Alignment rollers 210 can be formed of a polyurethane, metal, metal alloy, or other material and are aligned such that their axis of rotation is perpendicular to drive axis 608. In general, alignment rollers 210 function to prevent large scale twisting or rotation about drive axis 608 that might be caused by external disturbances, but the alignment rollers 210 permit slight rotation when subjected to torque of a constant direction and magnitude through relatively large amounts of linear travel. For example, the alignment rollers 210 can permit output shaft 106 to rotate 0.1-1 degree per meter of travel when subjected to a consistent torque caused a misaligned belt 212. This relatively minor slippage allows for the system to self-align during operation due to forces exerted by belt 212 on sheaves within the pulley systems (202 and/or 206) that generate a corrective torque that trends toward a fleet angle free (or true running) position. This self-alignment is discussed in further detail below with respect to FIGS. 8 and 8A.

The illustrated linear actuator 100 is a double acting linear actuator, but as discussed above with respect to FIG. 5B, other configurations are possible. For example, an actuator with a contracting pulley system 206 that relies on operational loads to re-expand and does not have an expanding pulley system 202 could be a "pull" only (tensile load) configuration. In another example, an actuator could have an expanding pulley system 202 and no contracting pulley system 206 and could be a "push" only (compressive load) actuator. Both above examples will still include alignment rollers 210 to achieve self-aligning characteristics and resist misaligning disturbances.

Figure 7:
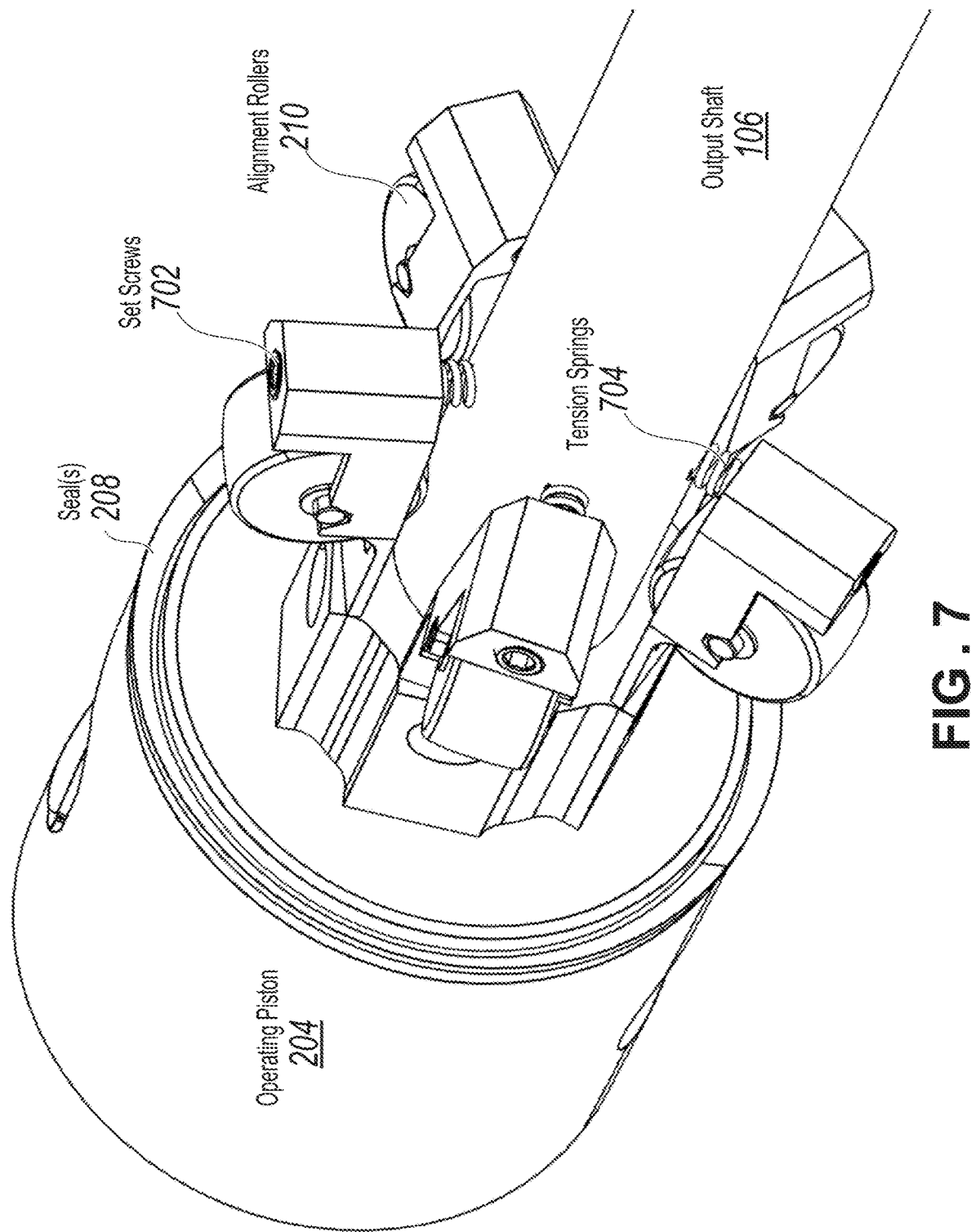
FIG. 7 is a perspective view of an operating piston with alignment rollers.

FIG. 7 is a perspective view of an operating piston 204 with alignment rollers 210. In the illustrated example, five alignment rollers 210 are used. However, fewer or more alignment rollers are possible. For example, a system with three alignment rollers 210 arranged in a triangular pattern could be implemented. Alignment rollers are mounted to the structure of operating piston 204 in a cantilevered fashion which permits tension springs 704 to preload each alignment roller 210 against the outer housing.

Radially preloading the alignment rollers 210 ensures tangential frictional forces between the alignment rollers 210 and the housing that are perpendicular to the radial preload and resist rotation of output shaft 106, operating piston 204, and any sheaves affixed to output shaft 106 and/or operating piston 204.

Tension springs 704 can be pre-compressed using set screws 702, to adjust the amount of force they apply to each alignment roller 210 to achieve a target preload for the alignment roller 210.

Overall, this configuration prevents rapid deviations from true-running alignment by resisting rotational forces or misaligning moments that may be internal or external to the linear actuator. However, small amounts of rotation will naturally be permissible over an extended amount of travel, which enables self-aligning properties of the belt-driven linear actuator. Specifically, belt-driven linear actuators will be naturally self-aligning because misaligned sheaves will cause the belt (e.g., belt 212 of FIG. 2) to apply aligning forces as illustrated below with respect to FIGS. 8 and 8A.

FIG. 7A is a partial cutaway diagram of an operating piston with alignment rollers. FIG. 7A illustrates the preload force 706 generated by tension springs 704. Each alignment roller 210 can have a preload force 706 that ensures a friction force 708 is available to be generated that may counteract a torque or twisting force applied to the output shaft 106.

FIG. 8 is a top view of an example pair of misaligned sheaves (802 and 804) engaged with a belt 810. Sheave 804 is misaligned with respect to sheave 802 causing increased sidewall pressure from belt 810 on both sheaves. This will result in sidewall forces 806A and 806B.

FIG. 8A is a perspective view of the example pair of misaligned sheaves engaged with belt 810. The misalignment causes sidewall forces 806A-D which will result in aligning moments 808A applied to sheave 802 by belt 810 and aligning moment 808B applied to sheave 804 by belt 810. If either sheave is free to rotate about axis 812 with respect to the opposing sheave, it will align as a result of the sidewall forces.

Returning to FIG. 2, a similar effect applies. If output shaft 106 is twisted, traveling sheaves in both contracting pulley system 206 and expanding pulley system 202 will become misaligned with their respective fixed counterparts. This misalignment will cause increased sidewall forces and aligning moments throughout linear actuator 100, and output shaft 106 will tend to self-align to a fleet angle free (or true-running) position as it operates, with alignment rollers 210 slipping gradually to allow the corrective action during movement.

Figure 9:
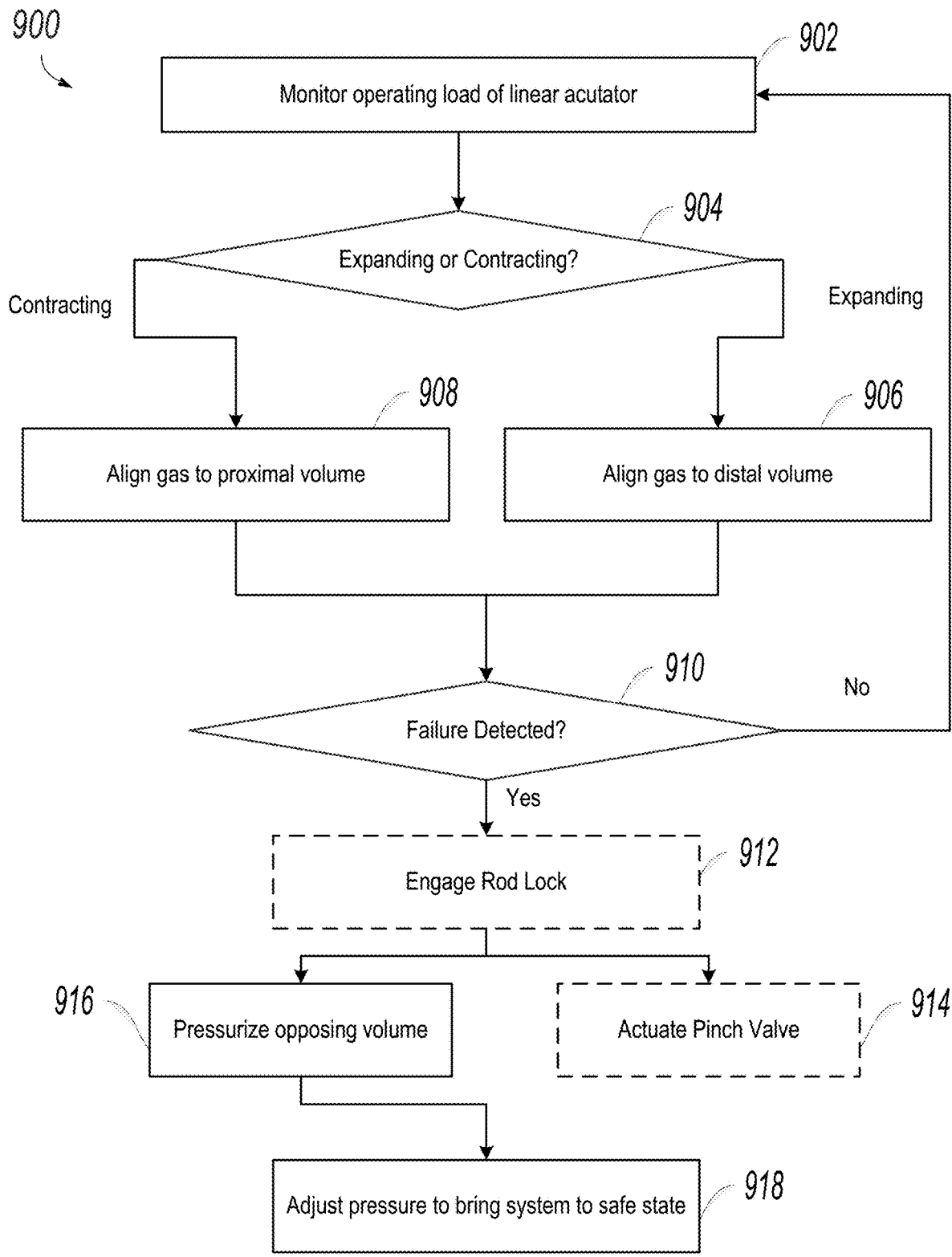
FIG. 9 is a flowchart illustrating an example process for pneumatically operating a linear actuator.

FIG. 9 is a flowchart illustrating an example process 900 for pneumatically operating a linear actuator. It will be understood that process 900 may be performed, for example, by any suitable system, environment, software, and hardware, or a combination of systems, environments, software, and hardware as appropriate. In some instances, process 900 can be performed by the system as described in FIGS. 1-7, or portions thereof, as well as other components or functionality described in other portions of this description. In other instances, process 900 may be performed by a plurality of connected components or systems. Any suitable system(s), architecture(s), or application(s) can be used to perform the illustrated operations. Further it should be noted that not every element of process 900 applies to every configuration. For example, single action linear actuators may not require actuation of a pinch valve as discussed below.

At 902, the operating load of a linear actuator is monitored. The operating load can be monitored by a controller and one or more sensors. In some implementations, operating load is sensed based on a motor driver that actuates the linear actuator. For example, motor current, and torque, as well as direction can be used to determine how much operating load is being experienced by the linear actuator. In another implementation, one or more sensors that measure belt tension within the linear actuator may be used to identify operating load. In some implementations, external sensor (e.g., cameras, weight sensors, etc.) that are separate from the linear actuator can be used to determine operating load. In general, the load on the linear actuator is monitored to determine both a magnitude and direction.

At 904, if the operating load is acting to contract the linear actuator, process 900 proceeds to 908. If the operating load is acting to expand the linear actuator, process 900 proceeds to 906. It should be noted that in some configurations where the linear actuator is designed to operate under load in a single direction, 902 and 904 can be combined and only a magnitude of the operating load need be determined. In these configurations, gas alignment and volume selection are not necessary as there may be only a single volume to pressurize.

At 906, when the operating load acts to expand the linear actuator, gas is aligned to a distal volume within the linear actuator. Gas alignment can be alignment of a flow path, for example aligning a three-way valve to direct gas from a high-pressure reservoir to the distal volume. Alternatively, aligning gas can represent "arming" or electrically preparing certain isolation valves to be opened. Regardless, the system is configured such that it is prepared to pressurize the distal volume.

At 908, when the operating load acts to contract the linear actuator, gas is aligned to a proximal volume within the linear actuator. Gas alignment can be alignment of a flow path, for example aligning a three-way valve to direct gas from a high-pressure reservoir to the distal volume. Alternatively, aligning gas can represent "arming" or electrically preparing certain isolation valves to be opened. Regardless, the system is configured such that it is prepared to pressurize the distal volume.

At 910, the system monitors the linear actuator for a failure. Failure can include belt failure, un-commanded motion, belt slippage/overloading, motor failure, or other failures that represent a loss of control in the linear actuator. If no failure is detected, process 900 returns to 902, and monitoring of operating load and monitoring for failures continue to occur. If a failure is detected, process 900 proceeds to 912.

At 912, optionally, a rod lock device is engaged. The rod lock device can be pneumatically, hydraulically, or electrically actuated and configured to prevent motion of the linear actuator while it is shifted to pneumatic operation. The rod lock device can remain engaged until the appropriate volume is sufficiently pressurized, and then the rod lock device can disengage to allow movement (e.g., relaxation or lowering) of the linear actuator.

At 914, in some configurations, one or more pinch valves are actuated. The pinch valves form a seal around the belt and isolate different volumes (e.g., distal volume 304 and proximal volume 302 of FIG. 3) from each other. In some implementations, the pinch valve(s) are actuated simultaneously with volume pressurization. In configurations that include only a single volume, or no segment of belt to be sealed there may be no pinch valve necessary.

At 916, the opposing volume is pressurized. The opposing volume is the volume that opposes the operational load. In some implementations the pressurization is achieved by opening an isolation valve between a high-pressure reservoir and the volume. In some implementations pressurization is achieved by energizing a compressor or initiating a chemical reaction to rapidly supply gas to the opposing volume. In some implementations, the pressure in the opposing volume is regulated or controlled and designed to match the operational load. It should be noted that matching the operational load does not necessarily mean that the resulting force from the internal pressure is equal to the operational load. Instead, matching can mean that the force differential between the operating load and the pressurized volume is less than a predetermined amount (e.g., 1000 kg, 100 kg, or 20 kg, etc.) In some implementations, matching internal pressure means that the differential pressure across the operating piston is sufficient to limit the translational speed of the linear actuator to a safe speed (e.g., 5 m/s, 1 m/s, or less).

At 918, after the opposing volume has been pressurized, or once pressurization is initiated, the pressure in the opposing volume is adjusted to return the linear actuator to a safe state. For example, the pressure can initially be rapidly raised to match the operational load, halting movement. Then pressure can be slowly released, for example, using one or more needle valves (e.g., needle valve 512 of FIG. 5) to allow the linear actuator to return to a relaxed condition in a slow and controlled manner. In some implementations, pressure in the opposing volume can be modulated, or electronically controlled using throttle valves in order to provide backup operation of the linear actuator.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations but is to be accorded the widest scope consistent with the principles and features disclosed herein.

The invention claimed is:

1. An alignment system for a belt-driven linear actuator comprising:
   an actuator chassis comprising an inner surface;
   a traveling assembly comprising an operating piston and an output shaft and configured to translate along a primary axis defined by a centerline of the output shaft;
   a roller rotatably coupled to the traveling assembly and configured to mechanically engage with the inner surface of the actuator chassis, the roller having an axis of rotation that is perpendicular to the primary axis, wherein the roller is engaged with the inner surface by a preloaded spring, wherein the spring is preloaded by a set screw;
   a first flanged sheave coupled to the output shaft;
   a second flanged sheave coupled to the actuator chassis; and
   a belt extending between and around the first and second sheaves.

2. The system of claim 1, wherein the first flanged sheave and the second flanged sheave operate as a pulley system configured to translate the output shaft along the primary axis.

3. The system of claim 1, wherein the roller has a curved surface shaped to maximize a contact area between the roller and the inner surface.

4. The system of claim 1, wherein the roller permits rotation of the output shaft about the primary axis in a range of 0.1-1 degrees of rotation per meter of travel.

5. The system of claim 1, wherein the roller is one of a plurality of rollers, wherein the plurality of rollers form an annular arrangement that at least partially encloses the output shaft.

6. A method for operating a belt-driven linear actuator comprising:
   preventing rotation about a primary axis when a traveling assembly is not translating by frictionally resisting rotation using one or more members affixed to the traveling assembly and mechanically engaged with an inner surface of an actuator chassis by one or more preloaded springs, wherein the one or more preloaded springs are preloaded by a set screw;
   translating the traveling assembly of the belt-driven linear actuator; and
   while translating the traveling assembly, allowing the traveling assembly to rotate about the primary axis to correct alignment of a belt between a first sheave and a second sheave, wherein the one or more members slip along the inner surface during rotation about the primary axis.

7. The method of claim 6, wherein the traveling assembly comprises:
   an operating piston and an output shaft configured to translate along the primary axis, wherein the primary axis is defined by a centerline of the output shaft.

8. The method of claim 6, wherein the one or more members comprise:
   a roller rotatably coupled to the traveling assembly and configured to mechanically engage with the inner surface of the actuator chassis, the roller having an axis of rotation that is perpendicular to the primary axis.

9. The method of claim 6, wherein the first sheave is a flanged sheave, and is coupled to the traveling assembly, wherein the second sheave is a flanged sheave and is coupled to the actuator chassis of the linear actuator, and wherein the traveling assembly rotates about the primary axis in response to sidewall forces generated between the first and second sheaves and the belt.

10. The method of claim 6, wherein allowing the traveling assembly to rotate comprises allowing the traveling assembly to rotate in a range of 0.1-1 degree per meter of travel.

11. The method of claim 6, wherein the first sheave and the second sheave operate as a pulley system configured to translate the traveling assembly along the primary axis.

12. A system for operating a belt-driven linear actuator comprising:
   a pneumatically operated system comprising:
      a proximal volume;
      a distal volume;
      an operating piston affixed to an output shaft of the linear actuator, the operating piston separating the proximal and distal volumes; and
      a valve configured to direct gas to the proximal or distal volume, thereby creating a differential pressure across the operating piston; and
   an alignment system configured to maintain rotational alignment of the output shaft of the linear actuator, the alignment system comprising:
      an actuator chassis comprising an inner surface a roller rotatably coupled to a traveling assembly and configured to mechanically engage with the inner surface of the actuator chassis, the roller having an axis of rotation that is perpendicular to a primary axis defined by a centerline of the output shaft, wherein the roller has a curved surface shaped to maximize a contact area between the roller and the inner surface;
      a first flanged sheave coupled to the output shaft;
      a second flanged sheave coupled to the actuator chassis; and
      a flat belt extending between and around the first and second sheaves.

13. The system of claim 12, wherein the roller is engaged with the inner surface by a spring.

14. The system of claim 12, wherein the first flanged sheave and the second flanged sheave operate as a pulley system configured to translate the operating piston along the primary axis.

15. The system of claim 13, wherein the spring is preloaded by a set screw.

16. The system of claim 12, wherein the valve is a three-way valve that is selectable to direct gas to either the proximal or the distal volumes, the system comprising:
   an isolation valve configured to, when opened, initiate flow of gas; and
   a controller, configured to receive information associated with the operating load of the linear actuator and align the three-way valve to direct gas to oppose the operating load.

17. The system of claim 16, wherein the controller is configured to adjust an amount of pressure supplied by the isolation valve to match the differential pressure across the operating piston with the operating load.

* * * * *